(12) United States Patent
Dombek

(10) Patent No.: US 6,708,694 B2
(45) Date of Patent: Mar. 23, 2004

(54) METHOD OF AND APPARATUS FOR MAKING AND PROCESSING ROD-SHAPED ARTICLES

(75) Inventor: Manfred Dombek, Dassendorf (DE)

(73) Assignee: Hauni Maschinenbau AG, Hamburg (DE)

( * ) Notice: Subject to any disclaimer, the term of this patent is extended or adjusted under 35 U.S.C. 154(b) by 0 days.

(21) Appl. No.: 09/773,490

(22) Filed: Feb. 2, 2001

(65) Prior Publication Data

US 2001/0032651 A1 Oct. 25, 2001

(30) Foreign Application Priority Data

Feb. 4, 2000 (DE) .......................................... 100 04 906

(51) Int. Cl.⁷ ............................... A24C 5/10; A24C 3/00
(52) U.S. Cl. ......................... 131/281; 131/27.1; 131/28
(58) Field of Search ............................... 131/281, 282, 131/28, 29, 27.1, 94, 32, 33, 35; 219/121.6, 121.61, 121.67, 121.71, 121.76

(56) References Cited

U.S. PATENT DOCUMENTS

| | | | | |
|---|---|---|---|---|
| 2,952,105 A | * | 9/1960 | Schur | 131/94 |
| 3,307,561 A | * | 3/1967 | Schubert et al. | 131/94 |
| 3,483,873 A | * | 12/1969 | Hinzmann | 131/254 |
| 3,996,851 A | * | 12/1976 | Urban | 101/247 |
| 4,003,386 A | * | 1/1977 | Bald et al. | 131/94 |
| 4,090,826 A | * | 5/1978 | Hinzmann | 131/281 |
| 4,121,595 A | | 10/1978 | Heitmann et al. | |
| 4,188,847 A | * | 2/1980 | Payne | 131/281 |
| 4,193,410 A | * | 3/1980 | Williams et al. | 131/281 |
| 4,249,545 A | * | 2/1981 | Gretz et al. | 131/281 |
| 4,265,254 A | * | 5/1981 | Koch et al. | 131/281 |
| 4,281,670 A | | 8/1981 | Heitmann et al. | |
| 4,319,589 A | * | 3/1982 | Labbe | 131/281 |
| 4,445,519 A | * | 5/1984 | Hinz et al. | 131/94 |
| 4,524,785 A | | 6/1985 | Seragnoli et al. | |
| 4,565,202 A | * | 1/1986 | Seragnoli et al. | 131/281 |
| 4,648,412 A | * | 3/1987 | Heitmann | 131/281 |
| 4,660,578 A | | 4/1987 | Mattei et al. | |
| 4,745,932 A | * | 5/1988 | Mattei et al. | 131/94 |

(List continued on next page.)

FOREIGN PATENT DOCUMENTS

| | | | |
|---|---|---|---|
| DE | 198 56 413 | 6/2000 | |
| DE | 198 57 576 | 6/2000 | |
| EP | 0 573 851 | 12/1993 | |
| EP | 1163856 A2 * | 12/2001 | A24C/5/60 |
| GB | 1046489 | 10/1966 | |
| GB | 2 146 229 | 4/1985 | |

*Primary Examiner*—Steven P. Griffin
*Assistant Examiner*—Carlos Lopez
(74) *Attorney, Agent, or Firm*—Venable LLP; Robert Kinberg; Chad C. Anderson

(57) ABSTRACT

Filter cigarettes of unit or multiple unit length are produced in a tipping machine wherein successive groups of coaxial plain cigarettes and filter rod sections are caused to roll within a channel bounded by surfaces at least one of which moves relative to the other(s). This results in the conversion of uniting bands, which are carried by successive groups into the inlet of the channel, into tubular sleeves connecting the tubular wrapper(s) of the filter rod section(s) to the plain cigarette(s) of the respective group. The wrappers, and normally also the uniting bands, are perforated in the channel subsequent to, or in part simultaneously with, the conversion of uniting bands into the respective sleeves. Each filter cigarette can be provided with one or more arrays, such as annuli, of perforations, e.g., by mutually inclined laser beams. Rolling movements of successive groups can be accelerated in several stages during and subsequent to entry into the channel, and this also applies for the deceleration of rolling movement ahead of, at and downstream of the outlet of the channel.

17 Claims, 7 Drawing Sheets

U.S. PATENT DOCUMENTS

| | | | |
|---|---|---|---|
| 4,781,204 A | * 11/1988 | Barbe et al. | 131/27.1 |
| 4,821,638 A | * 4/1989 | Uithoven | 101/40 |
| 4,825,882 A | 5/1989 | Hinz | |
| 4,827,947 A | * 5/1989 | Hinz | 131/281 |
| 5,135,008 A | 8/1992 | Oesterling et al. | |
| 5,148,818 A | 9/1992 | Arthur | |
| 5,390,684 A | * 2/1995 | Rizzoli et al. | 131/32 |
| 5,577,518 A | * 11/1996 | Draghetti et al. | 131/32 |
| 6,363,942 B1 | * 4/2002 | Dombek et al. | 131/281 |

* cited by examiner

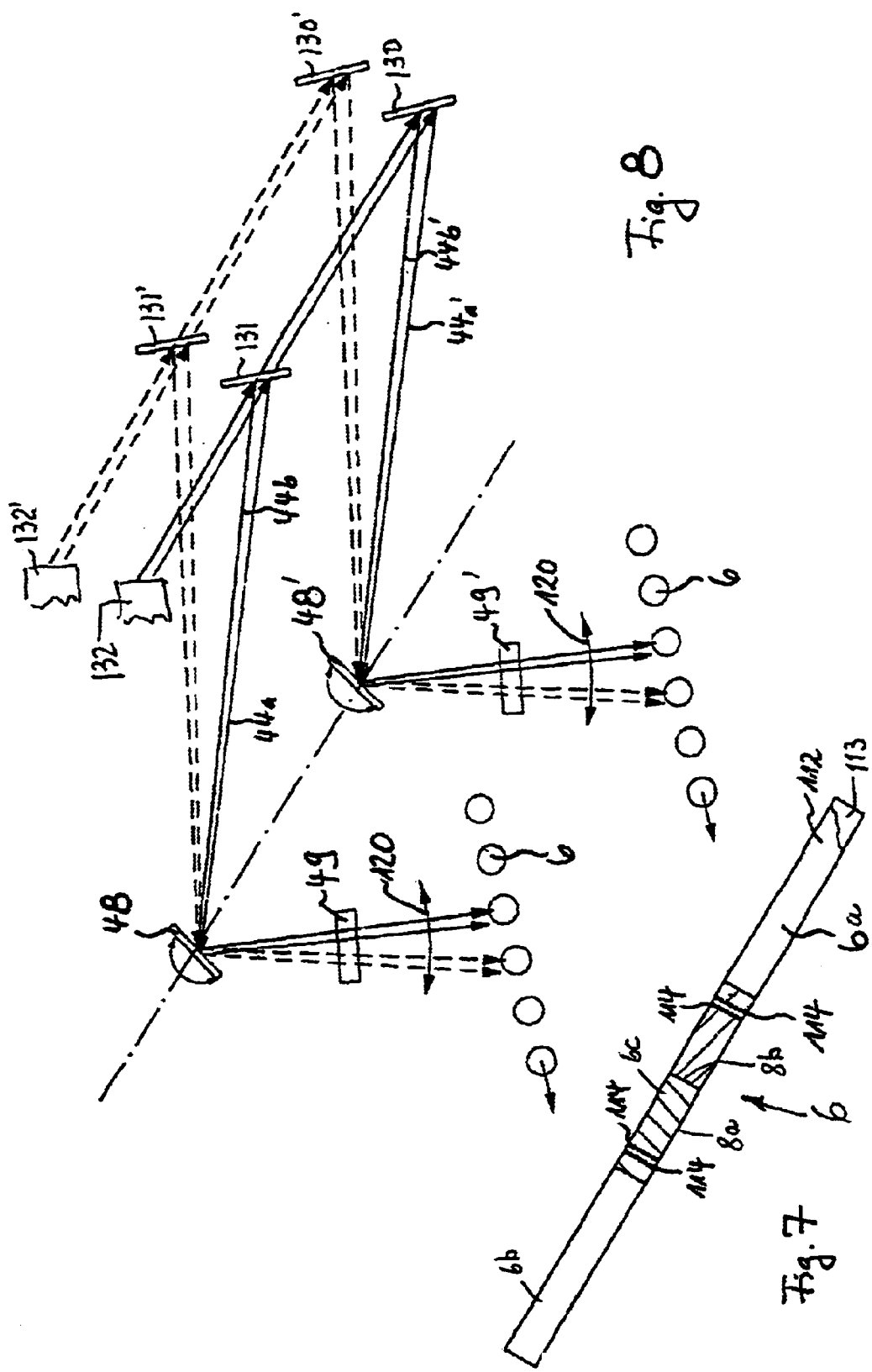

METHOD OF AND APPARATUS FOR MAKING AND PROCESSING ROD-SHAPED ARTICLES

CROSS-REFERENCE TO RELATED CASES

The present application claims the priority of commonly owned German patent application Serial No. 100 04 906.0 filed Feb. 4, 2000. The disclosure of the above-referenced German patent application, as well as that of each U.S. and foreign patent and patent application identified in the specification of the present application, is incorporated herein by reference.

BACKGROUND OF THE INVENTION

This invention relates to improvements in the making and processing of rod-shaped articles, Examples of articles which can be mass-produced and processed in accordance with the method and in the apparatus of the present invention are filter cigarettes and analogous rod-shaped smokers' products wherein coaxial rod-shaped components are held together by convoluted bands or strips of adhesive-coated paper, artificial cork or the like.

Filter cigarettes are mass produced in so-called tipping machines which are designed to connect one or more plain cigarettes of unit length or multiple unit length with one or more filter mouthpieces of unit length or multiple unit length. Connections are established by adhesive-coated uniting bands which are rolled in a channel around the locations where the ends of the mouthpieces are adjacent to and normally abut the ends of the plain cigarettes. This results in the conversion of uniting bands into tubular sleeves or collars which, as a rule or in many instances, completely surround the filter mouthpieces and further surround the adjacent end portions of plain cigarettes.

Prior to entry into the channel, each uniting band extends, e.g., tangentially, from the respective group of coaxial rod-shaped constituents (one or more filter mouthpieces and one or more plain cigarettes); such tangentially extending uniting bands are converted into the aforementioned tubular sleeves in response to rolling of the respective groups in the channel which is bounded by two surfaces at least one of which moves relative to the other. Reference may be had, for example, to commonly owned U.S. Pat. No. 4,1825,882 granted May 2, 1989 to Werner Hinz for "APPARATUS FOR ROLLING UNITING BANDS AROUND GROUPS OF ROD-SHAPED ARTICLES". A presently preferred apparatus for making filter cigarettes (normally filter cigarettes of double unit length) is disclosed in commonly owned U.S. Pat. No. 5,135,008 granted Aug. 4, 1992 to Erwin Oesterling et al. for "METHOD OF AND APPARATUS FOR MAKING FILTER CIGARETTES".

It is customary to provide the tubular envelopes of filter cigarettes and analogous rod-shaped smokers' products with perforations, i.e., to increase the permeability of the envelopes. At the present time, such perforations are formed by directing pulsating beams of coherent corpuscular radiation against selected portions of wrapping material for plain cigarettes or filter mouthpieces, against the wrapping material which is thereupon converted into discrete uniting bands, or against the tubular wrappers of finished plain or filter cigarettes or the like. The purpose of perforations in the tubular wrappers of rod-shaped smokers' products (such as the wrappers of mouthpieces forming part of filter cigarettes) is to admit cool atmospheric air into the column of tobacco smoke flowing from the lighted end of a filter cigarette into the mouth of the smoker. Such atmospheric air is believed to exert a desirable influence upon the nicotine and condensate in tobacco smoke. U.S. Pat. No. 4,281,670 (granted Aug. 4, 1981 to Uwe Heitmann et al. for "APPARATUS FOR INCREASING THE PERMEABILITY OF WRAPPING MATERIAL FOR ROD-SHAPED SMOKERS' PRODUCTS") discloses certain presently preferred apparatus which employ laser beams and can be utilized to make holes in the wrappers of plain cigarettes, filter rod sections, filter cigarettes and other rod-shaped smokers' products.

A drawback of presently known methods of and apparatus for making and processing rod-shaped products, especially rod-shaped commodities of the tobacco processing industry, is that such products are likely to be damaged (such as smudged, deformed, provided with cracks in the wrappers, provided with open seams, provided with leaks between the tobacco-containing sections and the filter mouthpieces of filter cigarettes and the like and/or otherwise affected) for a number of reasons, especially because the draping of uniting bands around the filter mouthpieces of filter cigarettes and the making of perforations in the wrappers of finished filter cigarettes or the like necessitate the transport of cigarettes through discrete rolling stations. For example, repeated rolling can or is likely or bound to cause a filter cigarette to exhibit an open seam or a soft end portion due to the escape of tobacco particles from the exposed tobacco-containing end of such smokers' product. Such tendency to undergo damage is attributable to the mechanical stresses due to repeated rolling of filter cigarettes and the like as well as to repeated acceleration and deceleration of the rolling movement caused by frictional engagement between the external surface of the tubular wrapper of a filter cigarette (or a constituent of a filter cigarette) and the surfaces bounding the rolling channels. At least one of these surfaces must move relative to the other surface or surfaces if the filter cigarette or a rod-shaped constituent of such article is to roll in its channel.

An additional drawback of the aforedescribed conventional methods and apparatus is that the apparatus occupy a substantial amount of space in a production line which, if designed to turn out and process filter cigarettes at the presently expected rate, normally comprises a filter cigarette maker, a filter rod maker, a tipping machine which assembles plain cigarettes with filter mouthpieces, a packing machine for arrays of filter cigarettes, a cellophaning machine which provides cigarette packs with transparent outer envelopes, a carton filling machine and a carton boxing machine.

OBJECTS OF THE INVENTION

An object of the present invention is to provide a method of making perforated filter cigarettes or like or analogous rod-shaped products, especially smokers' products, which is less likely to entail damage to the products than heretofore known methods.

Another object of the invention is to provide a method of shortening the intervals which are required to make and to further process, such as perforate, filter cigaretes and the like.

A further object of the invention is to provide a novel and improved method of assembling and processing, especially changing the permeability of, rod-shaped smokers' products in a time- and space-saving manner.

An additional object of the instant invention is to provide a method of the above outlined character which can be practiced by resorting to relatively simple, compact and reasonably priced apparatus.

Still another object of the invention is to provide a novel and improved apparatus for the practice of the above outlined method.

A further object of the invention is to provide a novel and improved machine for the making of filter cigarettes and analogous rod-shaped smokers' products.

Another object of the invention is to provide a combined filter tipping and perforating machine, especially for the mass production of filter cigarettes, cigars, cigarillos and analogous filter-tipped rod-shaped smokers' products.

An additional object of the invention is to provide a novel and improved apparatus for rolling rod-shaped articles in a filter tipping machine.

Still another object of the invention is to provide a novel and improved perforating unit for use in a filter tipping machine.

A further object of the instant invention is to provide novel and improved devices for accelerating and decelerating rolling movements of rod-shaped articles in a tipping machine or the like.

Another object of the invention is to provide high-quality rod-shaped commodities, especially high-quality filter cigarettes and the like.

An additional object of the invention is to provide a filter tipping machine wherein the mechanism which assembles plain cigarettes with filter mouthpieces and the mechanism which changes the permeability of tubular wrappers of the constituents of filter cigarettes or analogous smokers' products cooperate with each other in a novel and improved way.

Still another object of the invention is to provide a novel and improved mode of installing laser-operated perforating devices for the wrappers of rod-shaped commodities in a machine wherein such commodities must be rolled for a number of different reasons.

A further object of the present invention is to provide a filter tipping machine wherein rod-shaped articles can be rolled at optimum speeds for each of a plurality of different purposes such as the application of adhesive-coated uniting bands and the making of perforations in the tubular wrapper or wrappers for one or more constituents of a filter cigarette or the like.

SUMMARY OF THE INVENTION

One feature of the present invention resides in the provision of a method of making smokers' products of the type wherein a rod-shaped component (e.g., rod-like fillers of two plain cigarettes and a rod-like filler of a filter rod section of double unit length between the cigarette fillers) is surrounded by a tubular wrapper which, in turn is surrounded by a strip of paper or other suitable deformable sheet material. The improved method comprises the steps of contacting a portion of the tubular wrapper with a portion of the strip, imparting to the wrapper a multiple-interval rolling movement to thus convolute the strip around the wrapper at least during a first interval of the rolling movement, and changing the permeability of the tubular wrapper and/or of the strip, at least during a second interval which follows the first interval of rolling movement.

The smokers' products can constitute filter cigarettes, cigars or cigarilos of n times unit length (wherein n is a natural number including one). The improved method can be practiced with particular advantage in connection with the making of filter cigarettes of double unit length wherein two plain cigarettes of unit length are coaxial with and flank a filter rod section of double unit length.

The first interval of rolling movement can immediately precede the second interval or the second interval can partially overlap the first interval.

The rolling movement can include a first-speed movement during the first interval and a second-speed movement during the second interval; the second speed can equal or exceed the first speed. The movement imparting step can include accelerating the rolling movement to the second speed in a plurality of successive stages; such successive stages can include a first stage beginning at least substantially simultaneously with the start of rolling movement and a second stage beginning at least substantially with the start of the permeability changing step. The second speed is or can be at least twice the first speed.

If the rolling movement includes a first-speed movement during the first interval and a second-speed movement during the second interval, the method can further comprise the step of reducing—upon completion of the permeability reducing step—the speed of rolling movement from the second speed to zero speed in a single stage but preferably in a plurality of successive stages.

The permeability changing step can include perforating the (partly or fully convoluted) strip and/or the tubular wrapper.

The movement imparting step can include moving the tubular wrapper sideways along an at least substantially straight path or along an at least partly arcuate path between a plurality of surfaces at least one of which moves relative to at least one other surface.

Another feature of the present invention resides in the provision of an apparatus for treating smokers' products (e.g., filter cigarettes of double unit length) of the type wherein a rod-shaped component is surrounded by a tubular wrapper carrying a deformable strip, such as an adhesive-coated uniting band of the type utilized to sealingly connect a filter rod section of double unit length to two coaxial plain cigarettes of unit length which flank the filter rod section. The apparatus comprises a rolling unit having surfaces defining a channel and including first and second surfaces at least one of which moves relative to another surface, means for feeding into the inlet of the rolling channel successive products of a series of products having tubular wrappers each of which is contacted by the respective strip whereby the wrapers are caused to roll due to contact with the aforementioned surfaces and to thus convolute the strips about the wrappers in a first portion of the channel (namely in a portion which is adjacent the inlet of the channel), and means for changing the permeability of the wrappers during rolling at least in a second portion of the channel between the first portion and the outlet of the channel.

The means for changing the permeability of the wrappers can comprise means for perforating the strip and/or the wrapper of each of the series of products in the second portion of the channel.

The second portion of the channel is or can be immediately adjacent the first portion (as seen in the direction from the inlet toward the outlet of the channel).

The second portion of the channel can partially overlap the first portion, i.e., the perforating means can be caused to perforate the strip and/or the wrapper even before the strip is converted into a tubular sleeve which surrounds a portion of the wrapper.

The rolling unit can include a rotary drum-shaped conveyor having a peripheral surface which constitutes the aforementioned at least one surface, and a stationary rolling member having a concave surface constituting the aforementioned other surface. Such rolling member can be provided with a window which communicates with the second portion of the channel, and the permeability changing means of such apparatus can include means for perforating the strip and/or the wrapper of each of the series of products by way of the window.

The rolling unit of the improved apparatus can comprise a first endless band having an external surface constituting the aforementioned at least one surface, a second endless band having an external surface constituting the aforementioned other surface, and means for driving at least one of the endless bands. The external surfaces can be positioned in such a way that they define at least the first portion of the channel.

It is also possible to design and assemble the rolling unit in such a way that it includes an endless band having an external surface constituting a portion of or the entire at least one surface, and a stationary rolling member having a surface which constitutes the aforementioned other surface. Such endless band and the rolling member cooperate to jointly define the second portion of the channel. The rolling member of such apparatus can be provided with a window which communicates with the second portion of the channel, and the means for changing the permeability of the wrappers in such apparatus can include means for perforating the wrappers by way of the window. The band can include two spaced apart endless sections or belts and the means for changing the permeability of the wrappers can include means for perforating the wrappers by radiation being propagated along a path which extends between the spaced apart sections or belts of the band. Alternatively, the endless band can comprise three endless sections or belts; one of the sections is flanked by the other two sections and such other sections cooperate with the stationary rolling member to define the second portion of the channel. The three sections cooperate with a further band to define the first portion of the channel and the rolling unit of such apparatus can further comprise means for deflecting the one section from the channel between the first and second portions of such channel.

Still further, the rolling unit of the improved apparatus can include a first endless band which flanks the first portion of the channel and two additional bands which are spaced apart from each other and flank the second portion of the channel. The means for changing the permeability of wrappers in such apparatus can include a perforating unit which is arranged to perforate the wrappers of successive products in the second portion of the channel by way of a clearance between the additional bands. The just mentioned means for changing the permeability of the wrappers can include means for simultaneously perforating the wrappers of several sucessive products in the second portion of the channel; such successive products may but need not be immediately adjacent each other. To this end, the perforating means can comprise a source of at least two laser beams which make an acute angle selected in such a way that the laser beams impinge upon pairs of successive products in the second portion of the channel.

In accordance with one of several presently embodiments of the invention, the rolling unit includes a rotary conveyor having a peripheral surface forming part of the at least one surface, and the means for feeding successive products into the channel comprises product-receiving flutes which are provided in the peripheral surface of the rotary conveyor and are arranged to deliver successive products to the inlet of the channel. Such apparatus preferably further comprises means for expelling products from the flutes and for filling the flutes in the first and second portions of the rolling channel. The expelling means can comprise pushers which are movable in and at least substantially radially of the conveyor between retracted positions in which the respective flutes are free to receive portions of products and extended positions in which the pushers prevent entry of products into the respective flutes.

The novel features which are considered as characteristic of the invention are set forth in particular in the appended claims. The improved apparatus itself, however, both as to its construction and the modes of assembling and operating the same, together with numerous additional important and advantageous features and attributes thereof, will be best understood upon perusal of the following detailed description of certain presently preferred specific embodiments with reference to the accompanying drawings.

BRIEF DESCRIPTION OF THE DRAWINGS

FIG. 6 is a partly front elevational and partly vertical sectional view of an apparatus which includes a unit serving to define an arcuate rolling channel for the constituents of filter cigarettes or the like;

FIG. 7 is an elevational view of a filter cigarette of double unit length which can be turned out by the apparatus of FIG. 6 or by another embodiment of the improved apparatus; and FIG. 8 is a diagrammatic view of certain parts of a unit which can be utilized in one or more embodiments of the improved apparatus to influence the permeability of tubular wrappers for rod-shaped articles.

DESCRIPTION OF PREFERRED EMBODIMENTS

Figure 1:
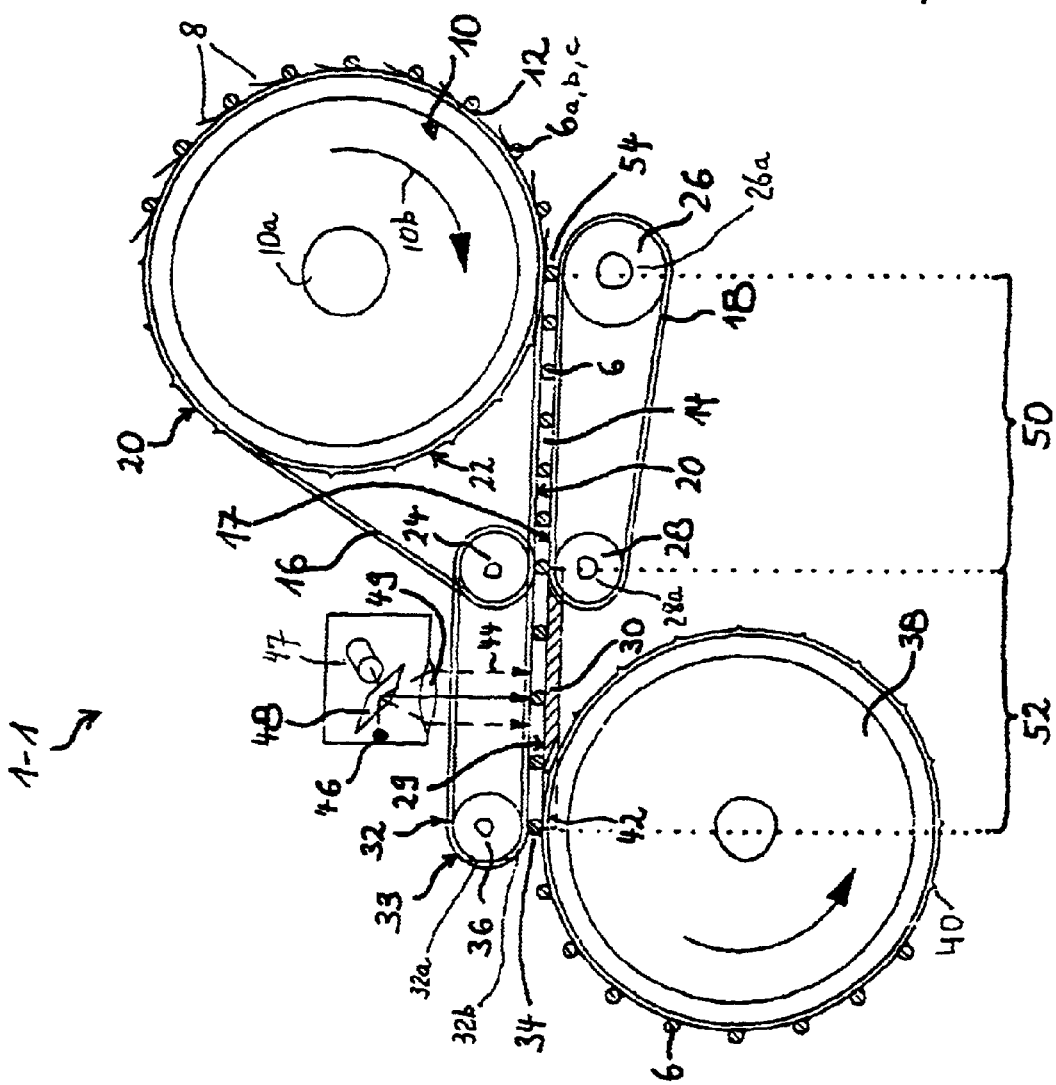
FIG. 1 is a schematic partly front elevational and partly sectional view of an apparatus which is installed in a tipping (filter cigarette making) machine and embodies one form of the present invention, the apparatus being provided with a straight rolling channel for completion of the making of successive filter cigarettes and for immediately following influencing of the permeability of tubular wrappers of successive filter cigarettes.

FIG. 1 shows as apparatus 1—1 which is designed to treat smokers' products 6. Each such smokers' product comprises two plain cigarettes 6a, 6b (see FIG. 7) of unit length, a filter rod section 6c of double unit length which is located between and is coaxial with the two plain cigarettes, and a tubular sleeve 8a which surrounds the entire filter mouthpiece of double unit length and the adjacent inner end portions of the two plain cigarettes. The sleeve 8a is a converted strip-shaped uniting band 8 one side of which is coated with a suitable adhesive and a portion of which adheres to the tubular wrapper of the filter rod section 6c prior to treatment of the uniting band in accordance with the present invention. When the treatment of the groups of coaxial rod-shaped articles 6a, 6b, 6c is completed, the uniting band 8 (hereinafter called strip) is converted into a sleeve 8a which sealingly connects the filter rod section 6c to the adjacent inner end portions of the plain cigarettes 6a, 6b. The sleeve 8a forms part of a composite tubular wrapper 112 (see FIG. 7) which is composed of the tubular wrappers or envelopes of the plain cigarettes 6a, 6b, of the tubular wrapper or envelope of the filter rod section 6c and of the sleeve 8a. Such composite tubular wrapper surrounds a rod-shaped component 113 (FIG. 7) which is composed of two rod-like tobacco fillers forming part of the plain cigarettes 6a, 6b and of a filter rod made, e.g. of acetate fibers and forming part of the filter rod section 6c.

In accordance with heretofore known methods (such as that disclosed in the aforementioned U.S. Pat. No. 5,135,008 to Oesterling et al.), the groups of parts 6a–6c and 8 are caused to pass through a first rolling channel (such as that defined by the parts 31, 32 shown in FIG. 1 of the '008 patent) in order to convert the strip 8 into a sleeve 8a, and thereupon through a discrete second rolling channel (such as that shown in FIG. 13 of the aforementioned U.S. Pat. No. 4,281,670 to Heitmann et al.). This would entail repeated acceleration of successive groups 6a–6c from zero rolling speed to a desired or optimum rolling speed (first to ensure the conversion of successive strips 8 into sleeves 8a and thereupon to ensure a proper increase of permeability of the composite wrapper of the filter cigarette 6 of double unit length). Moreover, the rolling speed of each filter cigarette of double unit length turned out by the apparatus of Oesterling et al. must be reduced to zero, and the same holds true for each filter cigarette which is subjected to a perforating (permeability influencing) treatment in accordance with the teaching of Heitmann et al.

The apparatus 1—1 of FIG. 1 is constructed and assembled in such a way that successive groups including the parts 6a–6c, 8 are set in rolling motion only once, namely in a straight rolling channel 14 wherein the strips 8 are converted into sleeves 8a which sealingly bond the respective parts 6a, 6b, 6c to each other (i.e., which connect such parts into filter cigarettes 6 of double unit length) Furthermore, each freshly formed filter cigarette 6 continues to roll and to thus advance into the range of a permeability changing (perforating) unit including a source 46 of corpuscular radiation which provides the sleeve 8a with a requisite number of suitably distributed perforations. FIG. 7 shows, by way of example only, four annuli 114 of perforations provided in the sleeve 8a (converted strip 8) and in the tubular envelope of the filter rod section 6c within such sleeve. The perforations admit atmospheric air into the column of tobacco smoke flowing from the lighted end of a filter cigarette of unit length (i.e., one-half of the filter cigarette 6 shown in FIG. 7). Conversion of filter cigarettes (6) of double unit length into filter cigarettes of unit length takes place at a severing or subdividing station corresponding to that shown at 36, 37 in FIG. 1 of the patent to Oesterling et al. Each filter cigarette 6 is severed midway across the sleeve 8a (this is shown in FIG. 7, as at 8b).

In the apparatus 1—1 of FIG. 1, the means for feeding successive groups 6a–6c into the inlet 54 of the straight rolling channel 14 (each such group carries an adhesive-coated strip 8 a portion of which adheres to a portion of the tubular wrapper of the section 6c of the respective group 6a–6c) comprises a rotary drum-shaped conveyor 10 having a cylindrical external surface 22 provided with axially parallel equidistant ribs 12. The trailing sides of the ribs 12 are adjacent suction ports (not shown) provided in the peripheral surface 22 and serving to attract discrete groups 6a–6c to the respective ribs 12 during advancement of the groups from a source (see the rotary drum-shaped conveyor 2 shown in FIG. 2) to the inlet 54 of the rolling channel 14.

A first portion or section 50 of the rolling channel 14 is defined by a first endless band 16 which is trained over the drum-shaped conveyor 10 and over a composite pulley 24, and by a second endless band 18 which is trained over two pulleys 26, 28. At least one of the pulleys 26, 28 is driven by a suitable prime mover, such as an electric motor (not shown), to advance the band 18 at a speed different from that of the band 16. This causes successive groups 6a–6c to roll about their respective axes and to travel in the channel portion 50 sideways in a direction from the inlet 54 toward the outlet 34 of the channel 14. The result: is that the strip 8 is convoluted around the respective filter rod section 6c and around the adjacent inner end portions of the plain cigarettes 6a, 6b.

In FIG. 1, the lower reach or stretch of the band 16 (at a level above the channel portion 50) is driven at a speed higher than the speed of the upper reach of the band 18, i.e., the groups 6a–6c in the channel portion 50 are caused to roll counterclockwise at a speed such that each group completes at least one full revolution in order to ensure the conversion of each strip 8 into a cylindrical sleeve 8a.

Each rib 12 comprises two spaced-apart portions flanking that portion of the band 16 which is trained over the conveyor 10. The spaced-apart portions of each rib 12 engage the free ends of the adjacent plain cigarettes 6a, 6b to determine the speed at which the respective groups 6a–6c enter the inlet 54 of the rolling channel 14. The first portion 50 of the channel 14 is bounded by the external surface 20 of the band 16 and by the external surface 17 of the band 18. The width of the channel 14 is selected in such a way that the groups 6a–6c are in frictional engagement with the surfaces 17, 20 during travel through the portion 50. Furthermore, the width of the band 16 at least matches the widths of the strips 8 to thus ensure highly predictable conversion of successive strips 8 into cylindrical sleeves 8a which sealingly secure the respective filter rod sections 6c to the adjacent end portions of the aligned plain cigarettes 6a, 6b.

Since the speed of the band 18 is less than that of the band 16, the groups 6a–6c begin to roll away from the respective composite ribs 12 at the instant of entry into the inlet 54 of the rolling channel 14 to thus ensure smooth and predictable transfer of successive groups 6a–6c from the peripheral surface 22 of the conveyor 10 into contact with the exposed surface 17 of the band 18. The external surface 20 of that portion of the band 16 which is trained over the drum-shaped conveyor 10 is preferably flush with the peripheral surface 22.

The speed of the band 18 can equal half the speed of the band 16. This ensures that the surfaces 17, 20 cooperate to ensure reliable conversion of successive strips 8 into sleeves 8a. The mutual spacing of successive groups 6a–6c in the portion 50 of the rolling channel 14 equals three fourths of the mutual spacing of groups 6a–6c at the periphery of the conveyor 10. Otherwise stated, the mutual spacing of successive groups 6a–6c in the channel portion 50 is three fourths of the mutual spacing of successive composite ribs 12 at the peripheral surface 22 of the conveyor 10.

A second portion 52 of the straight rolling channel 14 immediately follows the first portion 50 and is bounded in part by the upper side or surface 29 of a stationary rolling member 30 and at least in part by the external surface 33 of a composite third endless band 32 trained over the aforementioned pulley 24 for the band 16 and a further pulley 36 adjacent the outlet 34 of the channel 14. The pulley 24 includes a median portion for the band 16 and two end portions for the two spaced-apart sections or belts 32a, 32b of the band 32. The belts 32a, 32b are located in two parallel vertical planes and cause successive filter cigarettes 6 of double unit length to roll along the top surface 29 of the stationary rolling member 30.

The speed of the belts 32a, 32b forming part of the band 32 is twice the speed of the band 16. The composite tubular wrappers of successive filter cigarettes 6 of double unit length are perforated in the portion 52 of the channel 14, and the outlet 34 of this channel delivers successive filter cigarettes 6 to the peripheral surface of a take-off or evacuating conveyor 38 having axially parallel peripheral ribs 40 adjacent suction ports (not shown) which attract the filter cigarettes during travel to the next station (such as the aforementioned severing station where the cigarettes 6 are subdivided into pairs of mirror symmetrical filter cigarettes of unit length).

The apex of the drum-shaped conveyor 38 travels through a recess or cutout 42 provided in the stationary rolling member 30 and serving to ensure smooth transfer of filter cigarettes 6 from the channel portion 52 onto the periphery of the conveyor 38.

The two belts or sections 32a, 32b of the composite band 32 define a clearance or space which enables the pulsating beams 44 of corpuscular radiation to reach selected portions of the wrappers of successive (rolling) filter cigarettes 6 in the channel portion 52. The radiation source 46 (such as a laser) directs a beam of coherent corpuscular radiation against an oscillating beam splitting mirror 48 which is driven by a motor 47 and directs beams 46 against an optical element 49 which focusses the beams upon selected portions (see the annuli 114 of perforations shown in FIG. 7) of the composite envelopes of the filter cigarettes 6. The purpose of the oscillating mirror 46 is to ensure that the pulsating beams 44 continue to impinge upon and to perforate selected portions of the wrappers 112 of successive products 6 while such products roll in the portion 52 of the channel 14. The distances between successive products 6 in the channel portion 52 are the same as those between the groups 6a–6c at the peripheral surface 22 of the conveyor 10. This is due to the fact that the speed of the composite band 32 is twice the speed of the band 16.

The groups 6a–6c and thereupon the freshly formed filter cigarettes 6 continue to roll on their way from the inlet 54 and all the way to the outlet 34 of the channel 14. However, and as already explained hereinbefore, the speed of rolling movement in the channel portion 50 is different from that of rolling movement in the channel portion 52. The bands 16, 18 cooperate to accelerate successive groups 6a–6c from zero rolling speed at the inlet 54 to a first rolling speed in the channel portion 50, and the composite band 32 cooperates with the surface 29 of the stationary rolling member 30 to thereupon accelerate successive filter cigarettes 6 from the first rolling speed to a second rolling speed while the cigarettes 6 advance in the channel portion 52. The second rolling speed is reduced all the way to zero when the filter cigarettes 6 reach the peripheral surface of the take-off conveyor 38 at the outlet 34 of the rolling channel 14. In the apparatus 1—1 of FIG. 1, the ratio of mutual spacings first of the groups 6a–6c on the conveyor 10 and at the inlet 54 of the channel portion 50, and thereupon of the cigarettes 6 in the channel portions 50, 52 and finally on the take-off conveyor 38, is 12:9:12:12.

The means for driving the conveyor 10 comprises a suitable variable-speed prime mover (such as an electric motor, not shown) having an output shaft 10a which is coaxial with and rotates the conveyor 10 clockwise (see the arrow 10b), as viewed in FIG. 1. Alternatively, a constant-speed prime mover can drive the shaft 10a by way of a variable-speed transmission (not shown).

The means for rotating the pulley 26 and/or 28 for the belt 18 can comprise a discrete second prime mover. Alternatively, the prime mover which includes or rotates the shaft 10a can rotate the shaft 26a for the pulley 26 and/or the ahaft 28a for the pulley 28 by way of one or more variable-speed transmissions.

The means for rotating the shaft of the pulley 24 and/or 36 and the shaft of the conveyor 38 is or can be analogous with the aforediscussed means for rotating the shaft 10a and/or 26a and/or 28a.

Figure 2:
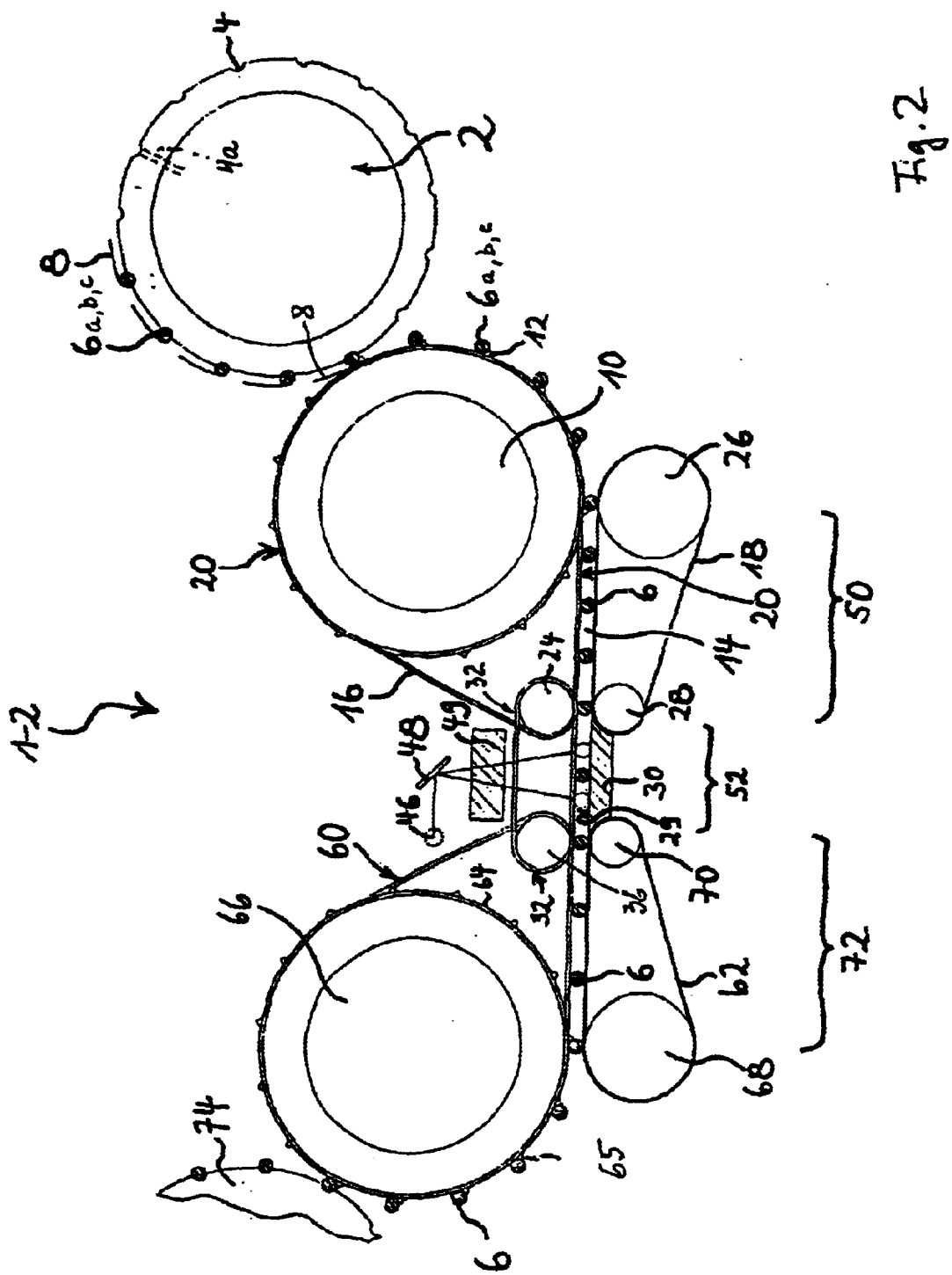
FIG. 2 is a similar schematic partly front elevational and partly sectional view of a modified apparatus wherein the rolling movements of successive commodities are accelerated and decelerated in a plurality of successive stages.

The apparatus 1–2 of FIG. 2 differs from the apparatus 1—1 of FIG. 1 primarily in that the straight rolling channel 14 extends well beyond the stationary rolling member 30. All such parts of the apparatus 1–2 which are identical with or clearly analogous to those shown in and already described with reference to the embodiment of FIG. 1 are denoted by similar reference characters. The apparatus 1–2 of FIG. 2 consists of two halves which are mirror images of each other with reference to a vertical plane bisecting the rolling member 30.

The portion 72 of the rolling channel 14 in the apparatus 1–2 is bounded by two endless bands 60 and 62 which are mirror images of the bands 16 and 18, respectively. The band 60 is trained over a rotary drum-shaped conveyor 66 and over a pulley or sheave 32, and the band 62 is trained over pulleys or sheaves 68, 70. The peripheral surface 64 of the conveyor 66 is provided with equidistant axially parallel ribs 65 corresponding to the ribs 12 of the conveyor 10. The ribs 65 deliver finished filter cigarettes 6 of double unit length into successive axially parallel peripheral flutes of a drum-shaped take-off conveyor 74. The latter can deliver cigarettes 6 to a severing or halving station (not shown), and the thus obtained filter cigarettes of unit length can be processed in a manner as described in the aforementioned U.S. patent to Oesterling et al.

The external surface of that portion of the band 60 which is trained over the conveyor 66 is preferably flush with the cylindrical external surface 64 of the conveyor 66.

The rolling movements of successive cigarettes 6 are brought to a halt at the discharge end of the channel portion 52 because the speed of the band 60 is the same as that of the band 62. The mutual spacing of successive cigarettes 6 in the channel portion 72 is the same as that between the ribs 12 on the conveyor 10. In the apparatus 1–2 of FIG. 2, the mutual spacings of successive groups 6a–6c on the conveyor 10, of cigarettes 6 in the channel portions 50, 52, 72 and of cigarettes on the conveyor 64 correspond to the ratio 12:9:12:12:12.

The means (not shown) for rotating the shafts of the conveyors 2, 10, 66 and the pulleys 26 and/or 28, 24 and/or 32 and 68 and/or 70 is or can be identical with or similar or analogous to the aforedescribed drive means for the rotary parts of the apparatus 1—1. The same holds true for the rotary parts of the apparatus 1–3, 1–4, 1–5 and 1–6 which will be described with reference to FIGS. 3, 4, 5 and 6–8.

Figure 3:
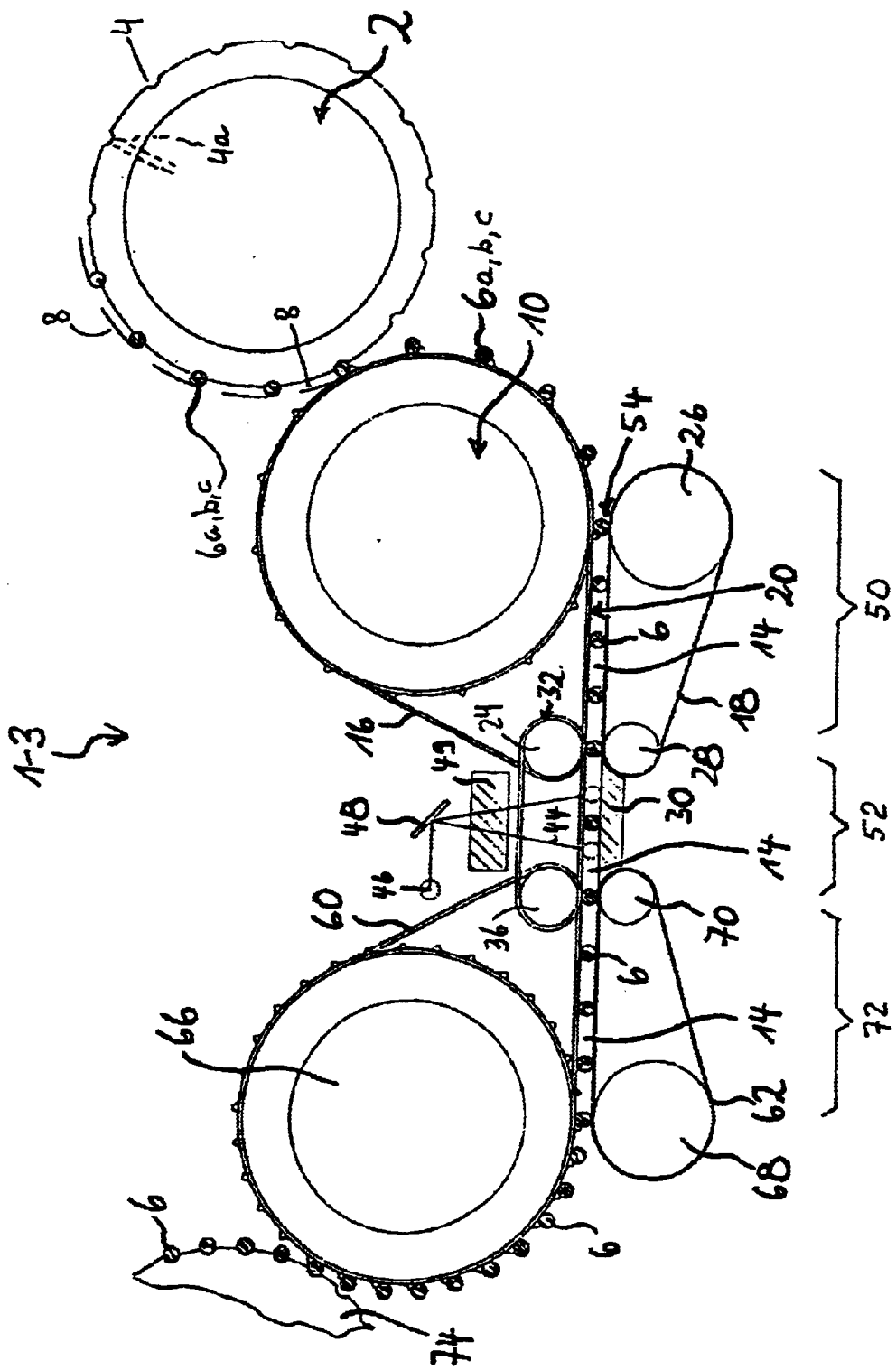
FIG. 3 is a similar view of a third apparatus constituting a modification of the apparatus shown in FIG. 2.

The apparatus 1–3 of FIG. 3 constitutes a modification of the apparatus 1–2. A difference between these apparatus is that, in FIG. 3, the mutual spacings of filter cigarettes 6 of double unit length in the portion 72 of the straight rolling channel 14 and on the conveyor 66 are different from those in the channel portion 72 and on the conveyor 66 of FIG. 2.

Thus, in FIG. 3, the spacing of filter cigarettes 6 in the channel portion 72 is the same as that in the channel portion 50. Furthermore, the spacing of cigarettes 6 at the periphery of the conveyor 66 shown in FIG. 3 equals two-thirds of the spacing of cigarettes in the channel portion 72 of FIG. 3. In other words, the spacing of neighboring filter cigarettes 6 at the periphery of the conveyor 66 shown in FIG. 3 is half the spacing of groups 6a–6c on the conveyor 10. Therefore, the speed of rolling movement of cigarettes 6 in the channel portion 72 of FIG. 3 is less than that of rolling movement of cigarettes in the channel portion 52. The spacings of groups 6a–6c on the conveyor 10 and the spacings of filter cigarettes 6 in the channel portions 50, 52, 72 and on the conveyor 66 of FIG. 3 correspond to the ratio 12:9:12:9:6.

The conveyor 2 of FIG. 3 has axially parallel peripheral flutes 4 which communicate with suction ports (one shown at 4a) serving to attract groups 6a–6c of coaxial rod-shaped articles (each of which includes two plain cigarettes 6a, 6b of unit length and a filter rod section 6c of double unit length) from a source to the transfer station between the conveyors 2 and 10. Each group 6a–6c in a flute 4 of the conveyor 2 carries a non-convoluted uniting band or strip 8. This also applies for the apparatus 1–2 of FIG. 2.

Figure 4:
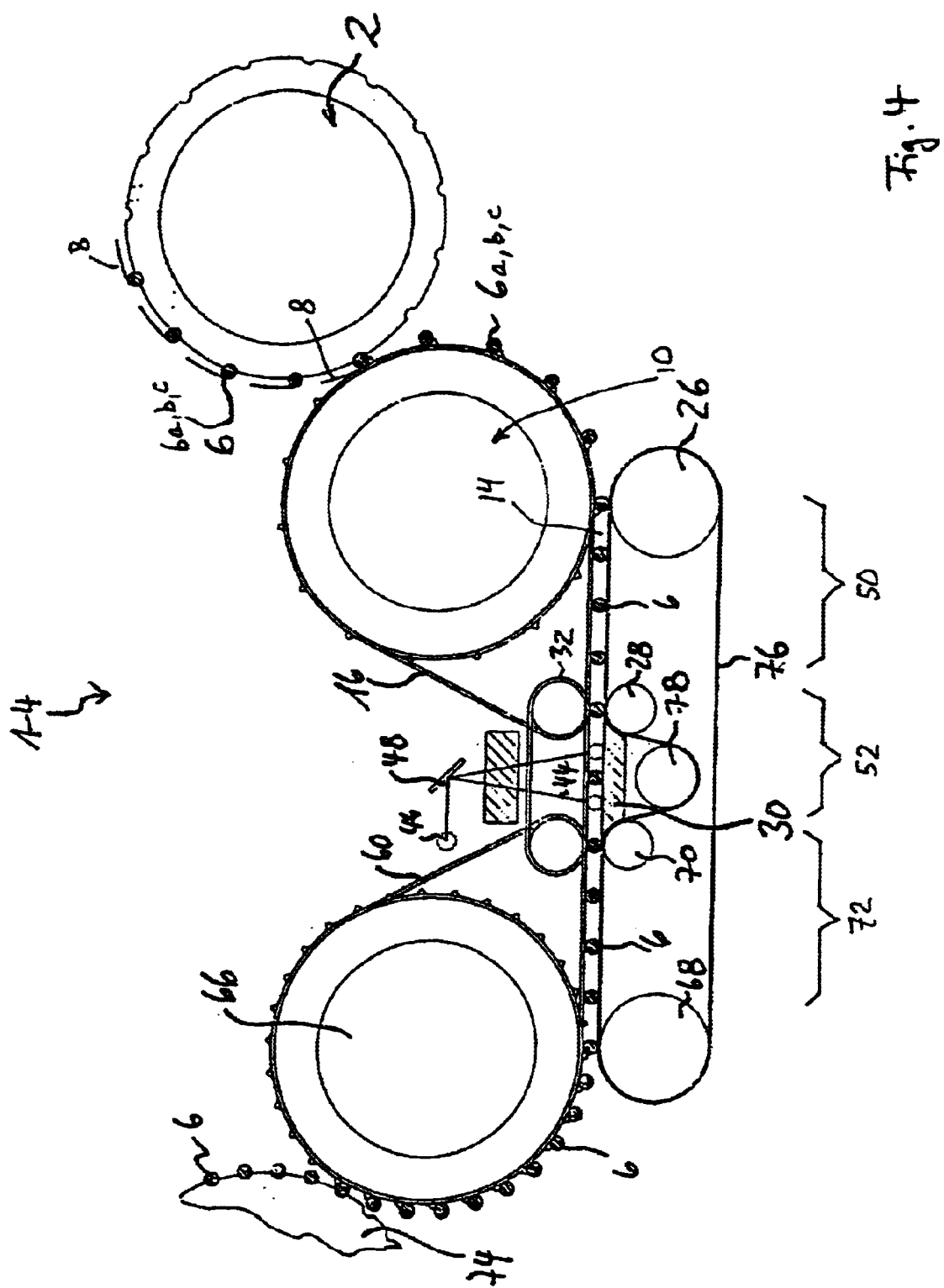
FIG. 4 is a similar view of a fourth apparatus constituting another modification of the apparatus shown in FIG. 2.

FIG. 4 shows certain details of an apparatus 1–4 which differs from the apparatus 1–3 primarily in that the bands 18, 62 of FIG. 3 are replaced by a single endless band 76 trained over the pulleys 26, 68 and over three additional pulleys or sheaves 28, 70, 78 which cause the median portion of the upper reach of the band 76 to travel beneath the stationary rolling member 30. The spacing of the groups 6a–6c on the conveyor 10 and of the cigarettes 6 in the portions 50, 52. 72 of the rolling channel 14 and on the conveyor 66 corresponds to the ratio 12:9:12:9:6, i.e., the same as in the apparatus 1–3 of FIG. 3.

Figure 5:
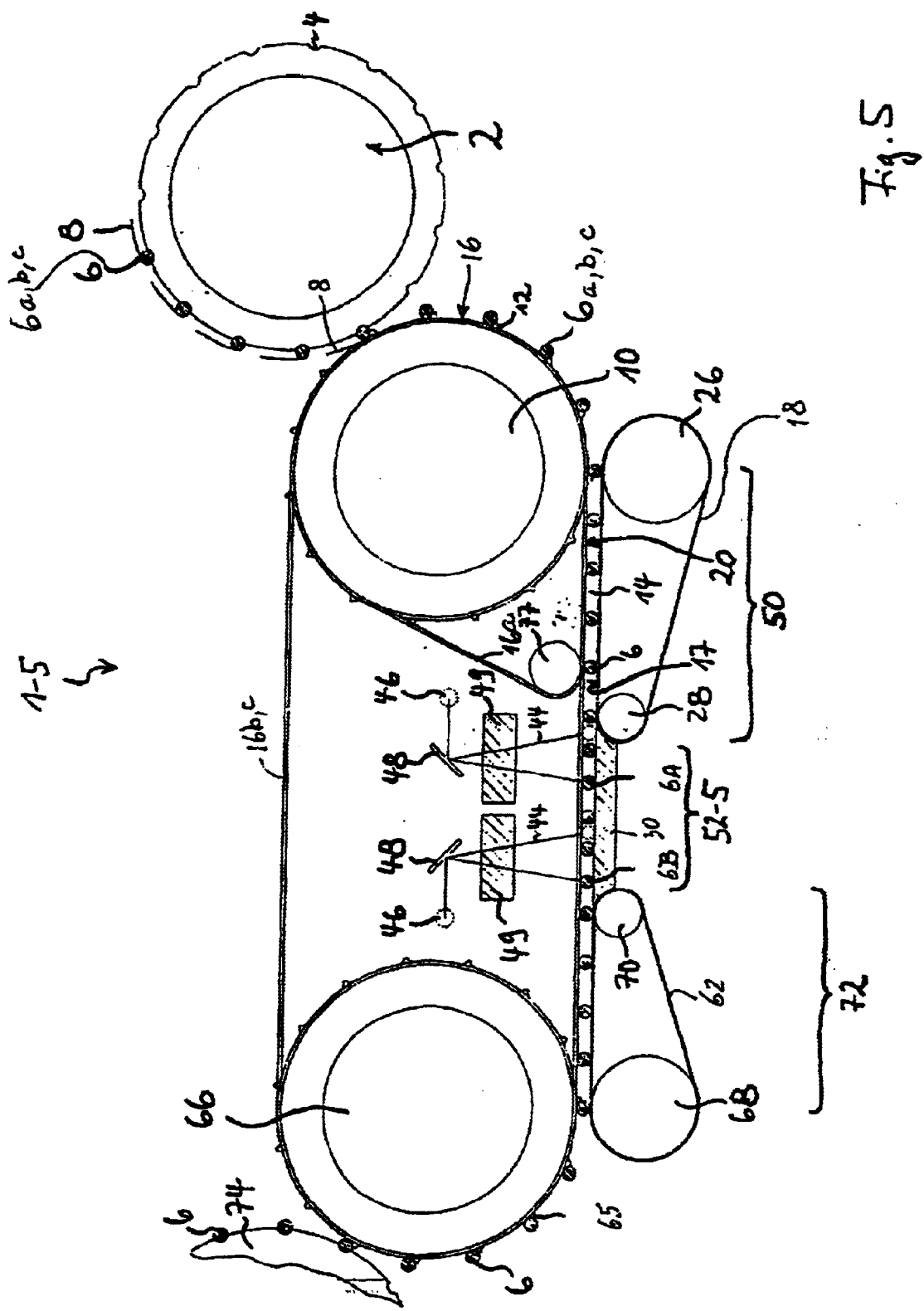
FIG. 5 is a similar view of a fifth apparatus employing a different permeability influencing unit.

The apparatus 1–5 of FIG. 5 is similar to the apparatus 1–2 of FIG. 2 except that it comprises a different permeability changing (perforating) unit which acts upon successive filter cigarettes 6 rolling in the median portion 52-5 of the straight rolling channel 14. The perforating unit comprises two radiation sources 46, two oscillatable mirrors 48, and two optical elements 49. The arrangement is such that the laser beams 44 can simultaneously impinge upon the wrappers of two cigarettes 6A, 6B of double unit length which may but need not immediately follow each other.

It is preferred to select the setup of the optical elements 48 and 49 in such a way that each of the lenses 49 focuses the respective beam 44 upon each second cigarette (6A, 6B) in the channel portion 52-5. In addition, the speed of rolling movement of cigarettes 6A, 6B in the channel portion 52-5 is reduced by one-third with respect to that of rolling movement of cigarettes 6 in the first channel portion 50. In other words, the rolling movements of cigarettes 6A, 6B in the channel portion 52-5 are relatively slow and, since each of the laser beams 44 impinges upon each second cigarette, the perforating operations take place at a rate as if they were carried out upon the wrappers of successive groups 6a–6c on the conveyor 10.

The band 16 of FIG. 5 includes three endless sections or belts including a median section or belt 16a which is trained over the conveyor 10 and over a pulley or sheave 77, and two longer outer sections or belts 16b, 16c which are trained over the conveyors 10, 66 and have straight horizontal or substantially horizontal lower reaches extending above all three rolling channel portions 50, 52-5, 72. The pulley 77 is located ahead of the stationary rolling member 30 so that the median belt 16a of the composite band 16 provides room between the lower reaches of the belts 16b, 16c to establish paths for the penetration of laser beams 44 from the two optical elements (such as lenses) 49 and into the median portion 52-5 of the rolling channel 14.

The spacing of successive filter cigarettes 6 in the channel portion 72 matches that in the channel portion 50 This is achieved by selecting the speed of the band 62 to match that of the band 18. Such spacing increases at the periphery of the conveyor 66 to match that of the groups 6a–6c at the periphery of the conveyor 10. The ratio of spacings of successive groups 6a–6c on the conveyor 10 and of successive filter cigarettes 6 in the portions 50, 52-5 and 72 of the rolling channel 14 and at the periphery of the conveyor 66 equals 12:9:6:9:12.

It goes without saying that at least some other embodiments of the improved apparatus, such as the apparatus 1—1 of FIG. 1, can also comprise permeability changing (such as perforating) units with plural sources of corpuscular or other suitable radiation.

Figure 6:
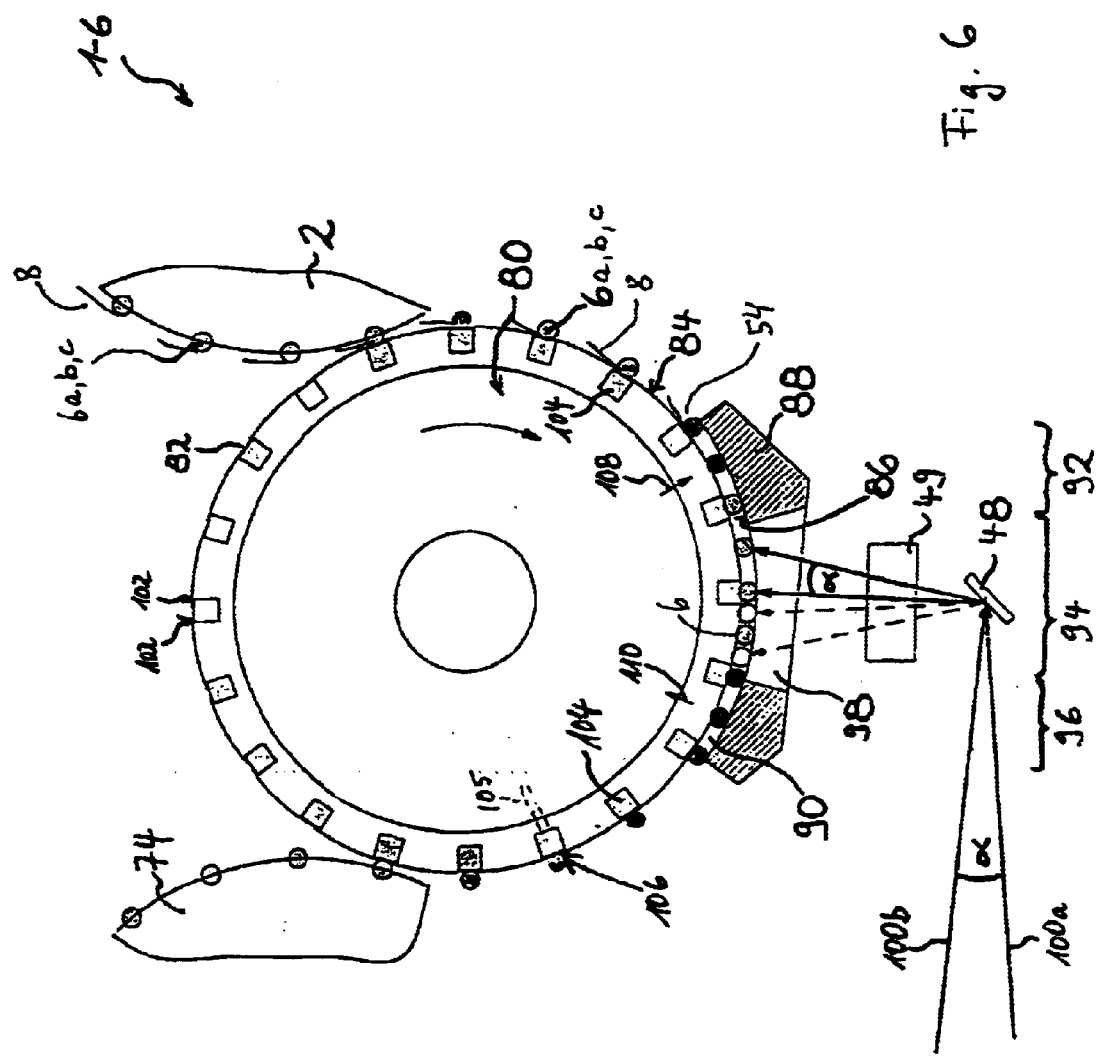

FIG. 6 illustrates a portion of an apparatus 1–6 wherein the cylindrical peripheral surface 84 of a rotary drum-shaped conveyor 80 and the complementary concave surface 86 of a stationary rolling member 88 define an arcuate rolling channel 90. The conveyor 80 receives successive groups 6a–6c (each of which carries a substantially tangentially extending adhesive-coated uniting band 8) from a rotary drum-shaped conveyor 2 in a manner different from that described with reference to FIG. 2.

The peripheral surface 84 of the conveyor 80 is provided with relatively shallow equidistant axially parallel grooves or flutes 82. The rolling channel 90 includes a first portion 92 wherein the uniting bands or strips are convoluted around the rod-shaped sections 6c of the respective groups 6a–6c, a second portion 94 wherein the tubular wrappers 112 of successive freshly formed filter cigarettes 6 of double unit length are provided with perforations 114 (reference should be had again to FIG. 7), and a third portion 96 wherein the filter cigarettes 6 advance toward the outlet of the rolling channel 90.

The rolling member 88 has a centrally located opening or window 98 which permits beams 10a, 100b of coherent radiation to penetrate into the channel portion 94 and to perforate selected portions of the wrappers 112 of successive filter cigarettes 6. The beams 10a, 100b are deflected by an oscillating mirror 48 and are caused to follow filter cigarettes 6 in the channel portion 94 by a suitable optical element (e.g., a lens) 49. The beams 100a, 100b make an acute angle α which is selected in such a way that these beams can simultaneously change the permeabilities of two portions of each of the series of successive filter cigarettes 6 in the channel portion 94. An advantage of such mode of operation is that a longer interval of time is available for each perforating operation. Thus, the speed of rolling movement of filter cigarettes 6 in the channel 90 can be reduced accordingly which reduces the likelihood of damage to the filter cigarettes rolling past the window 98 in the stationary rolling member 88 without causing a reduction of the output of the production line which embodies a tipping machine employing the apparatus 1–6 of FIG. 6.

In order to avoid the need for rolling movements of successive groups 6a–6c over the axially parallel edges or ridges 102 (which flank the front and rear sides of the flutes 82 in the peripheral surface 84 of the conveyor 80) while such groups begin to roll at the inlet of the arcuate rolling channel 90, the conveyor 80 carries radially movable displacing elements 104 in the form of pushers which are caused to move radially outwardly (see the arrow 108) at the inlet of the channel 90 and to thus lift the groups 6a–6c out of the respective flutes 82. The pushers 104 remain extended (to at least partially but preferably completely or nearly completely fill the respective flutes 82) during travel past the rolling channel 90 but are retracted at the outlet of this channel so that the finished filter cigarettes 6 of double unit length can reenter the respective flutes, for example, by suction. To this end, the flutes 82 communicate with suction ports 105 (one shown in the left-hand portion of the conveyor 80) which begin to communicate with a suitable suction generating device (e.g., with the suction intake of a suitable fan, not shown) upon arrival at the outlet of the rolling channel 90 and continue to attract the filter cigarettes 6 all the way to the transfer station between the conveyor 80 and a take-off conveyor 74 for successive cigarettes 6.

The outer faces 106 of the pushers 104 are configured to lie flush with the adjacent portions of the peripheral surface 84 of the drum-shaped conveyor 80 during travel past the rolling channel 90. These pushers are retracted into the conveyor 80 (see the arrow 110) not later than downstream of the transfer conveyor 74 so that these flutes are again ready to receive fresh groups 6a–6c at the transfer station between the conveyors 2 and 80. In fact, the pushers 104 can be retracted from the respective flutes 82 immediately downstream of the outlet of the rolling channel 90 so that such flutes can again receive successive finished filter cigarettes 6 and deliver them to the transfer station between the conveyors 80 and 74.

FIG. 7 shows a finished filter cigarette 6 of double unit length as it appears upon advancement with the conveyor 80 in the channel portion 96, in its flute 82 on the way from the channel 90 to the conveyor 74 and in a flute of the conveyor 74. FIG. 7 further shows that the four annuli 114 of perforations form two pairs of closely adjacent annuli which are provided at opposite sides of the location of future cut 8b and extend through the convoluted strip (sleeve) 8a as well as through the wrapper of the filter rod section 6c. The wrapper of the filter rod section 6c is surrounded by the sleeve (convoluted strip) 8a. Each of the annuli 114 can constitute a circumferentially complete ring-shaped array of equidistant perforations having identical sizes and/or shapes.

FIG. 8 illustrates one presently preferred manner of directing laser beams 100a, 100b toward and into the window 98 of the stationary rolling member 88 shown in FIG. 6 to provide successive filter cigarettes 6 with two pairs of annular arrays 114 of perforations. The sources 132, 132' discharge pulsating laser beams 44a, 44b and 44a', 44b'. These beams are partially reflected by mirrors 131, 131' and those portions of the beams 44a, 44b and 44a', 44b' which are transmitted by the mirrors 131, 131' are fully reflected by additional mirrors 130, 130'. The beams 44a, 44b and 44a', 44b' are nearly parallel to each other. The oscillatable mirrors 48, 48' (the oscillating means can include suitable motors corresponding to the motor 47 shown in FIG. 1) cause the beams 44a, 44b and 44a', 44b' to impinge upon lenses 49, 49' which cause the beams to travel (see the double-headed arrows 120) with the filter cigarettes 6 rolling in the channel portion 94.

The making of perforations (such as those forming part of the arrays 114) can begin (in the rolling channel 14 or in the rolling channel 90) even before the conversion of strip 8 into sleeves 8a is completed. This might not be necessary if the portion 52 or 52-5 of the straight rolling channel 14 or the portion 94 of the arcuate rolling channel 90 suffices to complete the perforating step without necessitating a rolling of the groups 6a–6c at an excessively high speed.

The features of the apparatus 1—1 can be combined with or utilized in lieu of certain features of the apparatus 1-2 to 1–6 and/or vice versa. Furthermore, certain features of the aforedescribed presently preferred embodiments of the improved apparatus are believed to be novel per se and, therefore, merit patent protection with as well as independently of other features of the respective apparatus. For example, the features which are shown in and which were described with reference to FIGS. 6 to 8 are believed to merit patent protection individually (such as the perforating unit) as well as jointly with other features (such as the means defining an arcuate wiling channel which extends beyond the perforating unit). Reference should be had to the commonly owned copending patent application Serial No. 09/775,638 filed Feb. 5, 2001 by Manfred Dombek for "METHOD OF AND APPARATUS FOR INCREASING THE PERMEABILITY OF WRAPPERS OF ROD-SHAPED ARTICLES". FIGS. 1–3 of the just mentioned copending patent application are identical with FIGS. 6–8 of the present application.

An important advantage of the improved method and apparatus is that they render it possible to produce high-quality filter cigarettes, filter cigars, filter cigarillos and anlogous products which must undergo several different treatments while rolling to move sideways past several treating and/or processing stations. Moreover, such several different treatments can be carried out and completed without affecting the appearance and/or other desirable characterstics of the ultimate products and without causing a reduction of the output of machines or production lines for the making of such products.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of making and processing filter cigarettes and the like and, therefore, such adaptations should and are intended to be comprehended within the meaning and range of equivalence of the appended claims.

What is claimed is:

1. Apparatus for treating smokers' products of a type wherein a rod-shaped component is surrounded by a tubular wrapper carrying a deformable strip, comprising:

a rolling unit having surfaces defining a channel and including first and second surfaces at least one of which moves relative to the other thereof, said channel having an inlet and an outlet;

means for feeding into said inlet successive products of a series of products having tubular wrappers each of which is contacted by the respective strip means of convoluting the strips about the wrappers in a first portion of the channel at said inlet; and means for changing the permeability of the wrappers during rolling at least in a second portion of the channel between said first portion and said outlet, wherein a portion of one of the first and second surfaces is stationary and flat.

2. The apparatus of claim 1, wherein said means for changing the permeability of the wrappers comprises means for perforating at least one of the wrapper and the strip of each of said series of products in said second portion of said channel.

3. The apparatus of claim 1, wherein said second portion of said channel is immediately adjacent said first portion as seen in a direction from said inlet toward said outlet.

4. The apparatus of claim 1, wherein said second portion of said channel partially overlaps said first portion.

5. The apparatus of claim 1, wherein said rolling unit includes a rotary drum-shaped conveyor having a peripheral surface constituting said at least one surface and a stationary rolling member having a concave surface constituting said other surface.

6. The apparatus of claim 1, wherein said rolling unit has a window communicating with said second portion of said channel and said means for changing the permeability of the wrappers includes means for perforating at least one of the wrapper and the strip of each of said series of products by way of said window.

7. The apparatus of claim 1, wherein said rolling unit includes an endless band having an external surface constituting a portion at least of said at least one of the first and second surfaces, and a stationary rolling member having a surface constituting said other surface, said second portion of said channel being defined by said endless band and said rolling member.

8. The apparatus of claim 7, wherein said rolling member has a window communicating with said second portion of said channel, said means for changing the permeability of the wrappers including means for perforating the wrappers by way of said window.

9. The apparatus of claim 7, wherein said band includes two spaced apart endless sections and said means for changing the permeability of the wrappers includes means for perforating the wrappers by radiation being propagated along a path extending between said spaced apart sections of said band.

10. The apparatus of claim 1, wherein said rolling unit includes a rotary conveyor having a peripheral surface forming part of said at least one surface and said means for feeding comprises product-receiving flutes provided in said peripheral surface and arranged to deliver succesive products to said inlet, and further comprising means for expelling products from said flutes and for filling said flutes in said first and second portions of said rolling channel.

11. The apparatus of claim 10, wherein said expelling means comprises pushers movable in and at least substantially radially of said conveyor between retracted positions in which the respective flutes are free to receive portions of products and extended positions in which the pushers prevent entry of products into the respective flutes.

12. Apparatus for treating smokers' products of a type wherein a rod-shaped component is surrounded by a tubular wrapper carrying a deformable strip, comprising:
  a rolling unit having surfaces defining a channel and including first and second surfaces at least one of which moves relative to the other thereof, said channel having an inlet and an outlet;
  means for feeding into said inlet successive products of a series of products having tubular wrappers each of which is contacted by the respective strip whereby the wrappers are caused to roll due to contact with said surfaces and to thus convolute the strips thereabout in a first portion of the channel at said inlet; and
  means for changing the permeability of the wrappers during rolling at least in a second portion of the channel between said first and said outlet,
  wherein a portion of one of the first and second surfaces is stationary and flat, and wherein said rolling unit includes a first endless band flanking said first portion of said channel and two additional endless bands spaced apart from each other and flanking said second portion of said channel, said means for changing the permeability of the wrappers including a perforating unit arranged to perforate the wrappers of successive products in said second portion of said channel by way of a clearance between said additional bands.

13. The apparatus of claim 12, wherein said means for changing the permeability of the wrappers includes means for simultaneously perforating the wrappers of several successive products in said second portion of said channel.

14. The apparatus of claim 13, wherein said perforating means includes a source of at least two laser beams making an angle arranged to ensure the impingement of laser beams upon pairs of successive products in said second portion of said channel.

15. Apparatus for treating smokers' products of a type wherein a rod-shaped component is surrounded by a tubular wrapper carrying a deformable strip, comprising:
  a rolling unit having surfaces defining a channel and including first and second surfaces at least one of which moves relative to the other thereof, said channel having an inlet and an outlet;
  means for feeding into said inlet successive products of a series of products having tubular wrappers each of which is contacted by the respective strip means for convoluting the strips about the wrappers in a first portion of the channel at said inlet; and
  means for changing the permeability of the wrappers during rolling at least in a second portion of the channel between said first portion and said outlet,
  wherein said rolling unit includes a first endless band having an external surface constituting said at least one surface, a second endless band having an external surface constituting said other surface, and means for driving at least one of said endless bands.

16. The apparatus of claim 15, wherein said external surfaces define at least said first portion of said channel.

17. Apparatus for treating smokers' products of a type wherein a rod-shaped component is surrounded by a tubular wrapper carrying a deformable strip, comprising:
  a rolling unit having surfaces defining a channel and including first and second surfaces at least one of which moves relative to the other thereof, said channel having an inlet and on outlet;
  means for feeding into said inlet successive products of a series of products having tubular wrappers each of which is contacted by the respective strip whereby the wrappers are caused to roll due to contact with said surfaces and to thus convolute the strips thereabout in a first portion of the channel at said inlet; and
  means for changing the permeability of the wrappers during rolling at least in a second portion of the channel between said first portion and said outlet,
  wherein a portion of one of the first and second surfaces is stationary and flat,
  wherein said rolling unit includes an endless band having an external surface constituting a portion at least of said at least one of the first and second surfaces, and a stationary rolling member having a surface constituting said other surface, said second portion of said channel being defined by said endless band and said rolling member, and
  wherein said endless band comprises three endless sections, one of said sections being flanked by the other two of said sections and said other sections cooperating with said stationary rolling member to define said second portion of said channel, said three sections cooperating with a further band to define said first portion of said channel and said rolling unit further comprising means for deflecting said one of said sections from said channel between said first and second portions of said channel.

* * * * *